(12) United States Patent
Sanso et al.

(10) Patent No.: US 10,084,829 B2
(45) Date of Patent: Sep. 25, 2018

(54) AUTO-GENERATION OF PREVIEWS OF WEB CONFERENCES

(71) Applicant: Adobe Systems Incorporated, San Jose, CA (US)

(72) Inventors: Antonio Sanso, Duggingen (CH); Damien Antipa, Saint-Louis (FR)

(73) Assignee: Adobe Systems Incorporated, San Jose, CA (US)

( * ) Notice: Subject to any disclaimer, the term of this patent is extended or adjusted under 35 U.S.C. 154(b) by 429 days.

(21) Appl. No.: 15/007,423

(22) Filed: Jan. 27, 2016

(65) Prior Publication Data

US 2017/0214723 A1 Jul. 27, 2017

(51) Int. Cl.
- *H04N 5/93* (2006.01)
- *H04L 29/06* (2006.01)
- *G06F 3/0482* (2013.01)
- *G06F 17/30* (2006.01)

(52) U.S. Cl.
CPC .......... *H04L 65/403* (2013.01); *G06F 3/0482* (2013.01); *G06F 17/30752* (2013.01)

(58) Field of Classification Search
CPC . H04L 65/403; G06F 3/0482; G06F 17/30752
USPC ........ 386/200, 278, 281, 282, 262, 326, 329
See application file for complete search history.

(56) References Cited

U.S. PATENT DOCUMENTS

| 9,092,437 | B2* | 7/2015 | Joy | G06F 17/30056 |
| 2011/0307805 | A1* | 12/2011 | Bastide | G06Q 10/10 715/753 |
| 2013/0318083 | A1* | 11/2013 | Han | G06F 17/30595 707/736 |
| 2013/0346499 | A1* | 12/2013 | Spencer | H04L 65/403 709/204 |

* cited by examiner

*Primary Examiner* — Robert Chevalier
(74) *Attorney, Agent, or Firm* — Kilpatrick Townsend & Stockton LLP

(57) ABSTRACT

Techniques are disclosed for auto-generating a preview of a web conference based on participant interactions during the web conference. A web conference is recorded and includes a shared presentation and participant interactions. Key frames of the shared presentation are identified. During the web conference, differing amounts of interaction between the participants occurred during presentation of the respective key frames. The technique selects a subset of the key frames to include in the preview based on the differing amounts of interaction between the participants that occurred during presentation of the key frames and generates the preview using the subset of key frames. An example preview displays a sequence of key frames in which each key frame is displayed for a few seconds.

20 Claims, 6 Drawing Sheets

AUTO-GENERATION OF PREVIEWS OF WEB CONFERENCES

TECHNICAL FIELD

This disclosure relates generally to computer-implemented methods and systems for providing webinars, online meetings, video conferences and other web conference sessions and more particularly relates to providing previews of content from recorded web conference sessions.

BACKGROUND

Online services such as web conference applications allow users at remote locations to share electronic content, such as electronic documents and web content. Web conferences are used to conduct meetings and training events and/or present lectures or short presentations from any computer accessing a web conference. Web conference applications allow for online collaboration via webinars, interactive conferences, online workshops, web meetings, eLearning sessions, etc. Web conferences also often involve the exchange of data between various participants. Participants may communicate via text message, video chat, audio chat, etc.

Users operate computing devices and use computing services, such as a web conferencing service, to participate in web conferences. In many situations, one or more of the users are hosts of an online conference and other users are participants in the conference. The users are often in different geographic locations using different computing devices. There is often significant interest in live web conferences from participants in part because participants are able to ask questions about topics of interest to them. Because the participants are able to ask questions, provide input, and otherwise interact with the presenter(s) and other participants, they tend to value attending the live presentation. In contrast, there is generally significantly less interest in users accessing recorded web conferences. This is due, at least in part, to the fact that the users are often unaware that a recorded web conference includes contents that is of interest to the users. For example, if a weekly hour-long web conference during which participants ask technical questions to technical experts is recorded each week and a participant asks a question about a particular emerging technology one week, a user who is not able to attend that web conference session will be unaware that the recording of that session includes that emerging technology topic unless a participant happens to tell him. Generally, existing systems do not adequately identify content in recorded web conferences that is of potential interest to other users who were not able to attend the live web conferences and this is particularly the case when topics of discussion are not provided on an agenda or written materials associated with the web conference.

SUMMARY

Techniques are disclosed for auto-generating a preview of a web conference based on participant interactions during the web conference. A web conference is recorded and includes a shared presentation and participant interactions. Key frames of the shared presentation are identified. During the web conference, differing amounts of interaction between the participants occur during presentation of the respective key frames. The technique selects a subset of the key frames to include in the preview based on the differing amounts of interaction between the participants that occurred during presentation of the key frames. The technique generates the preview using the subset of key frames. An example preview displays a sequence of key frames in which each key frame is displayed for a few seconds.

These illustrative features are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

These and other features, aspects, and advantages of the present disclosure are better understood when the following Detailed Description is read with reference to the accompanying drawings, where.

DETAILED DESCRIPTION

Figure 1:
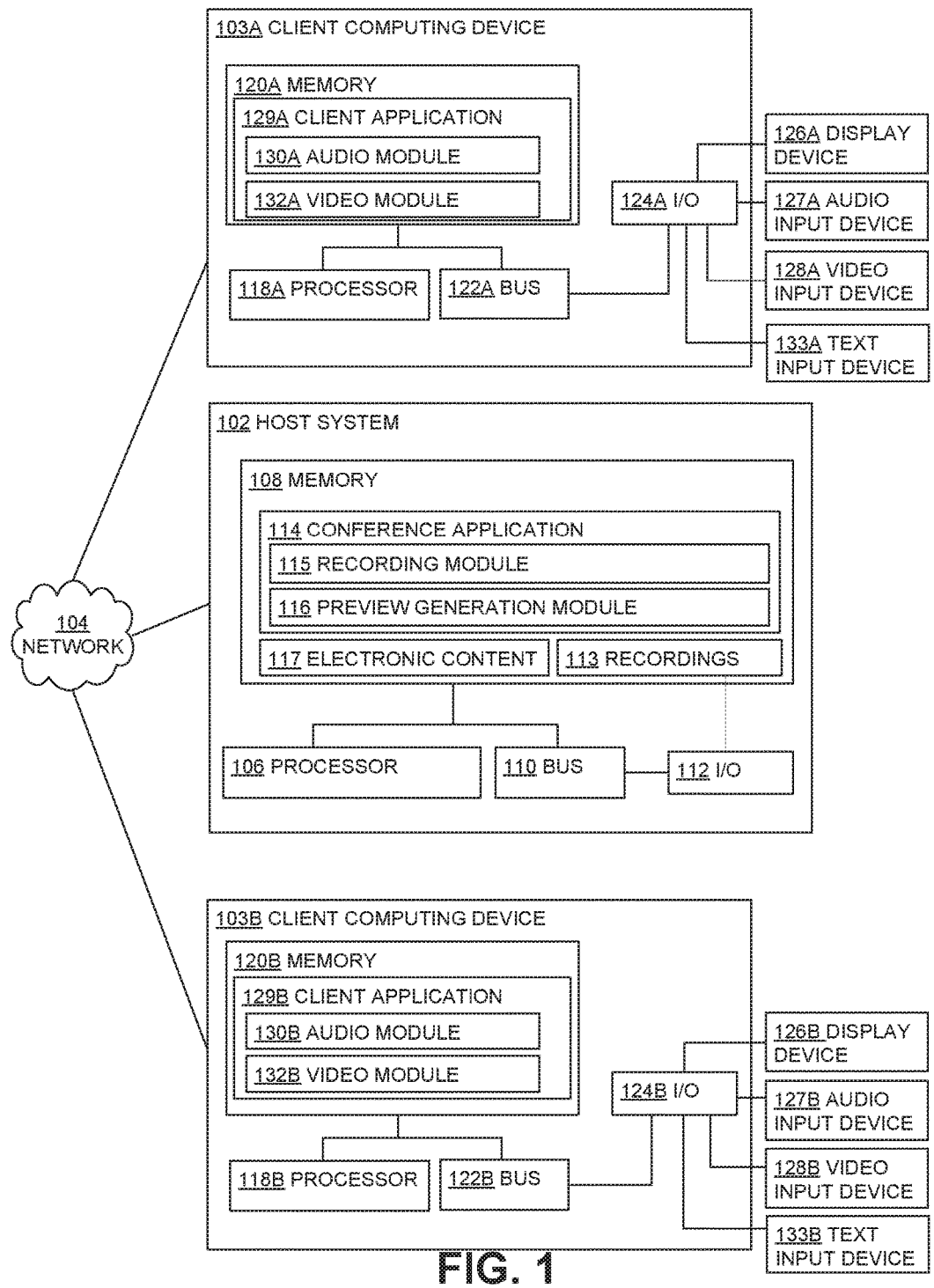
FIG. 1 is a block diagram depicting example computing systems for implementing certain embodiments.

As discussed above, existing systems do not adequately identify content in recorded web conferences that is of potential interest to other users who were not able to attend the live web conference. This problem is addressed by auto-generating a preview of a web conference based on participant interactions during the web conference. The technique selects a subset of key frames of the web conference to include in the preview based on the differing amounts of interaction between the participants that occurred during presentation of the key frames and generates the preview using the subset of key frames. In one example, for an hour-long web conference that has 100 key frames, the 5 key frames with the most participant interaction are selected and used in a preview. The preview shows each of the 5 selected key frames in a sequence for 3 seconds each. The 15 second preview is then made available to an audience of users who view the preview to determine whether or not to view the entire web conference recording.

By selecting key frames based on user interaction, the preview is more likely to include material that is also of interest to the audience of users who view the preview to determine whether or not to view the entire web conference. Accordingly, the techniques of embodiments of the invention disclosed herein improve upon prior systems that failed to provide previews of web conferences that showcased the portions of the web conference likely to be of interest to other users.

The selection of key frames to include in a preview is done automatically using a an algorithm that bases the determination on information that is collected for the web conference, such as which pods of the web conference users interacted with, when those interactions occurred, and how many interactions occurred. For example, a pod of a web conference devoted to participant questions will typically receive a large number of questions while a slide is being presented on a topic of significant interest to many of the participants. Based on recognizing that a large number of questions were received in the question pod during the presentation of that slide, the slide is selected for inclusion in a subset of key frames that will make up the preview. Similarly, a conversation pod that allows users to enter general comments will also experience higher interaction when the slide shows a topic of discussion of greater interest to the participants.

The selection of key frames for inclusion in a preview and key words identified in a web conference are also used, in one embodiment of the invention, to target a particular audience with the preview. For example, words on the key frames of the presentation selected for the preview are analyzed to identify that there was significant interest in slides and discussion relating to dogs during a web conference. A preview including the dog slides is automatically generated and sent to an audience of potential viewers who are known to have an interest in dogs.

As used herein, the terms "web conference," "electronic conference," and "electronic meeting" refer to a group of users coming together at either coordinated times or at a synchronized time, whereupon their presence is recorded and the users are participants in the meeting to some extent. Users present at an electronic meeting can include a meeting host and one or more participants. A web conference can comprise one or more web conference sessions where the participants' presence is either recognized or identified. That is, a web conference is something in which a user such as a host or a participant can be present or not present in, and can be participating or not participating in. A web conference can be an online session in which multiple clients at remote locations can share multimedia content and other electronic content in real time. The web conference can communicatively connect multiple clients for live sharing of documents, a desktop, a browser session, audio, and video. Text data can be received during the web conference in web conference pods or via documents. Examples of such text data are text items in documents being shared during a web conference, where the documents can include a PowerPoint™ presentation, a PDF file, or word processing documents. Audio data can also be received during the web conference. An example of such audio data is digital audio captured at different client devices when participants in the web conference speak to one another. A filter or other software module can be executed by the web conference application to filter the audio in real time.

As used herein, the terms "conference application" and "web conference application" are used to refer to a service or other application that can host a session for sharing electronic content in real time via a data network among multiple clients at remote locations. Non-limiting examples of a web conference include webinars, online workshops, online meetings, and the like. In some embodiments, a conference application allows multicast communications from one host client to many receiver clients. In other embodiments, a conference application allows real-time point-to-point communications. A conference application can include one or more additional features such as (but not limited to) text-based chat features, voice and video chat features, sharing of desktops, etc.

In one embodiment, a conference host uses a web conferencing service to share web conference content with one or more conference participants. The conference content can be a video stream corresponding to the host's desktop, the host's browser session, or a file provided by the host such as, for example, a PowerPoint™ presentation, a word processing file, or a PDF file. In certain embodiments, a conference application, such as, for example, Adobe® Connect™, is used to show conference content such as a PowerPoint™ presentation, a web page, a PDF file, a word processing document, a shared desktop, or other content during a web conference. When the content includes a document, such as a PowerPoint™ presentation, a PDF, or a word processing document, the document is typically uploaded to the conference application by a host of the conference. In one example, the host uploads the document before the conference begins. Other conference content, such as a shared desktop or a browser session of a conference host, can be streamed directly.

As used herein, the term "electronic content" is used to refer to any type of media that can be rendered for display or use at a computing system or other electronic device. Electronic content can include text or multimedia files, such as images, video, audio, or any combination thereof. Conference content can include electronic content. For example, conference content can include one more files uploaded to a conference application. Also, for example, web conference content can include a video stream corresponding to a presenter's shared desktop or a presenter's browser session.

Unless specifically stated differently, a "user" is interchangeably used herein to identify a user account of a conference attendee or participant, a human user, or a software agent. Besides a human user who accesses, hosts, and presents web conference content such as electronic documents, a software application or agent sometimes accesses and presents electronic documents. The systems and methods disclosed herein can provide copy/paste support for electronic documents presented in a web conference to conference attendees, where attendees can include both human users and software agents. Accordingly, unless specifically stated, the term "user" as used herein does not necessarily pertain to a human being.

As used herein the term "participant" refers to a person that attends, contributes to, presents, or is otherwise involved with a web conference when the web conference occurs. For example, a person using a computing device to access a web conference to view and/or listen to images, audio, or other content of the web conference during the web conference is a participant. As another example, a person that presents (i.e., a presenter) is also a participant. Web conferences involve varying numbers of presenters and other participants. Participants (both presenters and others) are able to provide interaction during a web conference.

As used herein the tem "interaction" refers to a participant of a web conference providing audio, video, text, or other input that is shared with one or more of the other participants during a web conference. A participant typing a text message in a chat pod that is displayed to other participants during the web conference is an interaction. A participant typing a text message to send a question only to the presenter is another example of an interaction. A participant answering a polling question in a poll pod during a web conference is another example of an interaction. A participant asking an audible question during a web conference is another example of an interaction. A participant highlighting content and/or cutting and pasting content of a web conference on the participant's own device during a web conference is another example of an interaction. Interactions are generally actions by a participant relating to the web conference that are trackable by a provider of the web conference, e.g., by the server providing he web conference.

As used herein the term "preview" refers to electronic content that presents selected portions of a web conference that has been recorded. One example of a preview is a 15 second video that shows 5 key frames (e.g., slides) of a lengthy presentation that was presented during a web conference. Another example of a preview is a composite image that includes 4 images from one or more pods of a presentation at different points in a web conference. Another example of a preview is a 1 minute video clip that includes recorded video clips of a presenter during selected portions of a web conference along with corresponding key frames of presentation used by the presenter during one or more of those selected portions.

As used herein the term "key frame" refers to an image, slide, or other portion of a web conference capable of being displayed in a preview of the web conference. A slide of a presentation is an example of a key frame. An image of a slide of a presentation is also an example of a key frame. A recording of a web conference, in one example, is segmented into a sequence of images that are compared with one another to identify key frames. Changes detected from one image to the next image are used to determine that the next image is a new key frame. Lack of changes detected from one image to the next image are used to determine that the next image is not a new key frame. Similarly, if adjacent images have some similar content but one of the images has an extra item, that image with the extra item is selected as the key frame in one embodiment based upon the expectation that it includes a more complete image of the key frame. This circumstance occurs, for example, when a presenter incrementally adds bullet points one at a time to a slide during a presentation.

As used herein the terms "presentation" and "shared presentation" refer to content that is shared by one participant with other participants of a web conference. A shared computing device screen of a web conference presenter is an example of a presentation and shared presentation. Sharing slide show slides and document pages are also examples of sharing a presentation. A presentation is not limited to static content or to content that is presented in a sequence. Accordingly, video clips and animations are also examples of presentations and shared presentations.

As used herein the term "pod" refers to a portion of a web conference. A web conference will typically display content from multiple pods simultaneously during the web conference with each pod providing a particular type of content, e.g., a presentation pod, a chat pot, a poll pod, etc. In one embodiment, pods are implemented as discrete communication modules such that participants can interact with a particular pod to view content and provide input that is specific to the pod and communicated to others in the web conference via pod-specific code and communication mechanisms.

Example Computing Environment

Referring now to the drawings, FIG. 1 is a block diagram depicting example computing systems for implementing certain embodiments. The example computing systems include a host system 102 and client computing devices 103*a*, 103*b* in communication via a network 104. The network 104 may be any type of communication network that may include, for example, any one or a combination of many different types of networks, such as cable networks, the Internet, wireless networks, cellular networks, and other private and/or public networks.

The host system 102 includes a processor 106. The processor 106 may include a microprocessor, an application-specific integrated circuit ("ASIC"), a state machine, or other suitable processing device. The processor 106 can include any number of computer processing devices, including one. The processor 106 can be communicatively coupled to a computer-readable medium, such as a memory 108. The processor 106 can execute computer-executable program instructions and/or accesses information stored in the memory 108. The memory 108 can store instructions that, when executed by the processor 106, cause the processor to perform operations described herein.

A computer-readable medium may include (but is not limited to) an electronic, optical, magnetic, or other storage device capable of providing a processor with computer-readable instructions. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may comprise processor-specific instructions generated by a compiler and/or an interpreter from code written in any suitable computer-programming language, including, for example, C, C++, C#, Visual Basic, Java, Python, Perl, JavaScript, and ActionScript.

The host system 102 may also include a number of external or internal devices, such as input or output devices. For example, the host system 102 is shown with an input/output ("I/O") interface 112. A bus 110 can also be included in the host system 102. The bus 110 can communicatively couple one or more components of the host system 102.

Each of the client computing devices 103*a*, 103*b* includes respective processors 118*a*, 118*b*. Each of the processors 118*a*, 118*b* may include a microprocessor, an ASIC, a state machine, or other processor. Each of the processors 118*a*, 118*b* can include any of a number of computer processing devices, including one. Such a processor can include or may be in communication with a computer-readable medium. As depicted in FIG. 1, each of the processors 118*a*, 118*b* is communicatively coupled to respective memories 120*a*, 120*b*. Each of the processors 118*a*, 118*b* respectively executes computer-executable program instructions and/or accesses information stored in the memories 120*a*, 120*b*. The memories 120*a*, 120*b* store instructions that, when executed by the processor, cause the processor to perform one or more operations described herein.

The client computing devices 103*a*, 103*b* may also comprise a number of external or internal devices such as a mouse, a CD-ROM, DVD, a keyboard, a display, audio speakers, one or more microphones, a camera or any other input or output devices. For example, each of the client computing devices 103*a*, 103*b* is respectively shown with I/O interfaces 124*a*, 124*b*, display devices 126*a*, 126*b*, audio input devices 127*a*, 127*b*, video input devices 128*a*, 128*b*, and text input devices 133*a*, 133*b*. A non-limiting example of a display device is a computer monitor or computer screen. A non-limiting example of an audio input device is a microphone. A non-limiting example of a video input device is a camera. Non-limiting examples of text input devices include a keyboard and a touch screen. Although FIG. 1 depicts the display devices 126*a*, 126*b*, audio input devices 127*a*, 127*b*, video input devices 128*a*, 128*b*, and text input devices 133*a*, 133*b* as separate devices coupled to the client computing devices 103a, 103b, some or all of the display devices 126a, 126b, audio input devices 127a, 127b, video input devices 128a, 128b, and text input devices 133a, 133b can be respectively integrated into the client computing devices 103a, 103b.

Buses 122a, 122b can be respectively included in the client computing devices 103a, 103b. Each of the buses 122a, 122b can communicatively couple one or more components of the client computing devices 103a, 103b.

FIG. 1 also illustrates the conference application 114 comprised in the memory 108 of the host system 102 and the client applications 129a, 129b respectively comprised in the memories 120a, 120b of the client computing devices 103a, 103b. The conference application 114 stored in the memory 108 can configure the processor 106 to manage and provide a web conference session between the client application 129a executed at the client computing device 103a and the client application 129b executed at the client computing device 103b. A non-limiting example of a conference application 114 is Adobe® Connect™. Non-limiting examples of client applications 129a, 129b include browser applications and conference client applications.

The client applications 129a, 129b can access the conference application 114 to establish a web conference or other communication session. A communication session for communicating via the conference application 114 can be established by the client applications 129a, 129b via the network 104 between client computing devices 103a, 103b and the host system 102. Each of the client applications 129a, 129b can include one or more software modules, such as the audio modules 130a, 130b and the video modules 132a, 132b. The audio modules 130a, 130b can respectively configure the processors 118a, 118b to communicate audio data to the conference application 114 and to process audio data received via the conference application 114 for playback at the client computing devices 103a, 103b. Audio data can be generated based on sounds captured by the audio input devices 127a, 127b. Audio data can also be generated by applications executed at the computing devices 103a, 103b. The video modules 132a, 132b can respectively configure the processors 118a, 118b to communicate video data to the conference application 114 and to process video data received via the conference application 114 for playback at the client computing devices 103a, 103b via the display devices 126a, 126b. Video data can be generated based on images captured by the video input devices 128a, 128b. Video data can also be generated by applications executed at the computing devices 103a, 103b, such as the sharing of desktops via the conference application 114.

In some embodiments, the client applications 129a, 129b can be stand-alone applications. In other embodiments, the client applications 129a, 129b can be embedded in another application, such as an internet browser application. A non-limiting example of a client application is Adobe® Connect™ client software.

The host system 102 can include any suitable computing system for hosting the conference application 114. In one embodiment, the host system 102 may be a single computing system, such as a server system. In another embodiment, the host system 102 may be a virtual server implemented using a number of computing systems connected in a grid or cloud computing topology. For example, the host system 102 may include a number of computing devices clustered as a computing system configured to host one or more network-based resources such as the conference application 114. A datacenter and a server farm are examples of such computing system. Computing devices 103a and 103b, and host system 102 may be connected by a network 104. The network 104 can be any type of communication network that may include, for example, any one or a combination of many different types of networks, such as cable networks, the Internet, wireless networks, cellular networks, and other private and/or public networks.

The client computing devices 103a, 103b can include any suitable computing device or system for communicating via a network 104 and executing the client applications 129a, 129b. Non-limiting examples of a suitable computing device or system include a desktop computer, a tablet computer, a smart phone, or any other computing device or system suitable for using electronic content.

The host system 102 can provide access to electronic content 117. The electronic content 117 may be resident in any suitable computer-readable medium and execute on any suitable processor. In one embodiment, the electronic content 117 can reside in the memory 108 at the host system 102. In another embodiment, the electronic content 117 can be accessed by the host system 102 from a remote resource, such as another computing system, via the network 104 and provided to the client computing devices 103a, 103b. Such electronic content 117 can include, for example audio, video, and textual content provided by conference application 114 to the client computing devices 103a, 103b as part of a web conference. In some embodiments, the electronic content 117 can be one or more files uploaded via the network 104 to the host system 102 before the conference begins. The uploaded files can include, but are not limited to, word processing files such as Microsoft® Word documents, presentation program files such as Microsoft® PowerPoint™ presentations, and/or PDF files. The uploads can be initiated by a participant in the conference, such as, for example a conference host or organizer.

The conference application 114 can include modules for analyzing, converting, modifying, storing, extracting, providing, or otherwise using the electronic content 117 in a web conference between the client applications 129a, 129b.

The conference application 114 includes a recording module 115 and a preview generation module 116. Although the recording module 115 and the preview generation module 116 are depicted in FIG. 1 and described herein as separate logical modules or components of a conference application 114 for ease of reference, other implementations are possible. In some embodiments, the conference application 114, recording module 115, and/or the preview generation module 116 are separate applications that are separately executed by the processor 106. In other embodiments, the conference application 114, recording module 115, and/or the preview generation module 116 are a combined logical module executed by the processor 106.

The recording module 115 records web conferences provided by the conference application 114 to create recordings 113. In one example, the recording module 115 records the web conference as a series of images, e.g., a video of what is shown on the web conference or on specific pods of the web conference, along with any audio that occurs during the web conference. In another example, the recording module 115 also records content from electronic content items that are used in the web conference. In a specific example, a recording 113 includes slides from a slide presentation uploaded by a presenter and used during the web conference.

The preview generation module 116 analyzes web conferences (live or in recordings 113) to generate previews of the web conferences. In one example, this involves identifying key frames of a shared presentation in a web conference, selecting a subset of the key frames to include in a preview based on amounts of interaction by participants that occurred during presentation of the key frames, and generating the preview using the subset of key frames. Various techniques are used to select key frames for a preview depending upon the particular implementation. Generally, the techniques select key frames so that the preview will include content that is likely to be of interest to one or more recipients who receive the preview. This in turn increases the likelihood that those recipients will choose to retrieve and view the web conference.

In additional or alternative embodiments, the conference application 114 can include other components. The other components (not shown) may include, but are not limited to, a chat pod, a conversation pod, and a webcam pod. According to these embodiments, a chat pod can be presented by the conference application 114 in a web conference between the client applications 129a, 129b so that users of client computing devices 103a, 103b can exchange chat communications input via their respective text input devices 133a, 133b. The chat pod and chat communications can be presented within a chat window of an interface of the conference application 114. A conversation pod can be used by users of client computing devices 103a, 103b to carry on a conversation using their respective audio input devices 127a, 127b. Similarly, a webcam pod can be used by the conference application 114 to present video content from video input devices 128a, 128b (e.g., respective webcams of client computing devices 103a, 103b). Windows for the pods can be displayed on the display devices 126a, 126b of client computing devices 103a, 103b used to access the conference application 114.

Figure 2:
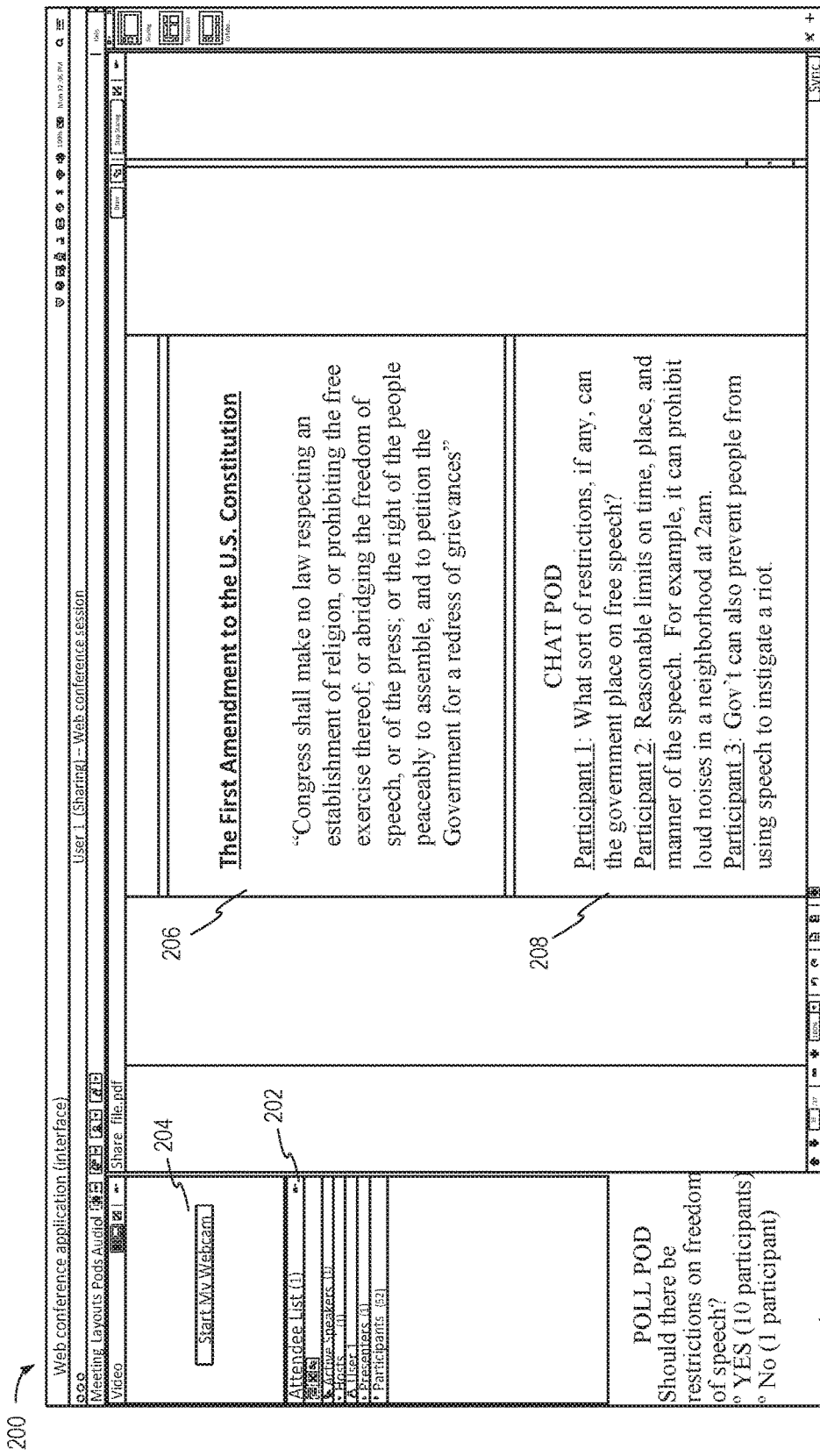
FIG. 2 is an illustration of an exemplary user interface of a web conference that includes a presentation and participant interactions, in accordance with embodiments.

FIG. 2 is an illustration of an exemplary user interface 200 of a web conference that includes a presentation and participant interactions, in accordance with embodiments. The user interface 200 includes an attendee list 202, a webcam pod 204, a presentation pod 206, a chat pod 208, and a poll pod 210. The attendee list 202 identifies the active speaker(s), host(s), and the number of presenters and the number of participants in the web conference. The webcam pod 204 allows one or more of the participants to share webcam images or streamed video from their respective devices. The presentation pod 206 presents content from a presentation, such as a text document, an image, a slide presentation, an animation, a shared screen of a presenter, and other types of sharable presentations. The displayed presentation content in the presentation pod 206 is static, non-static, or a combination of static and non-static content, depending upon the implementation. In this example, the presentation pod 206 shows a static slide with the content "The First Amendment to the U.S. Constitution 'Congress shall make no law respecting an establishment of religion, or prohibiting the free exercise thereof; or abridging the freedom of speech, or of the press; or the right of the people peaceably to assemble, and to petition the Government for a redress of grievances.'"

The chat pod 208, in this example, presents text-based messages submitted by one or more of the participants. In this example, the chat pod 208 includes a first message from Participant 1 stating "What sort of restrictions, if any, can the government place on free speech?," a second message from Participant 2 stating "Reasonable limits on time, place, and manner of the speech. For example, it can prohibit loud noises in a neighborhood at 2 am," and a third message from Participant 3 stating "Gov't can also prevent people from using speech to instigate a riot." These messages shown in chat pod 208 are examples of participant interactions.

The poll pod 210 includes a poll question "Should there be restrictions on freedom of speech?" and selectable yes/no options that participants individually select to respond to the poll question. The poll box 210 also identifies how many participants have responded with "yes" responses and how many participants have responded with "no" responses. These "yes" and "no" responses are also examples of participant interactions.

Figure 3:
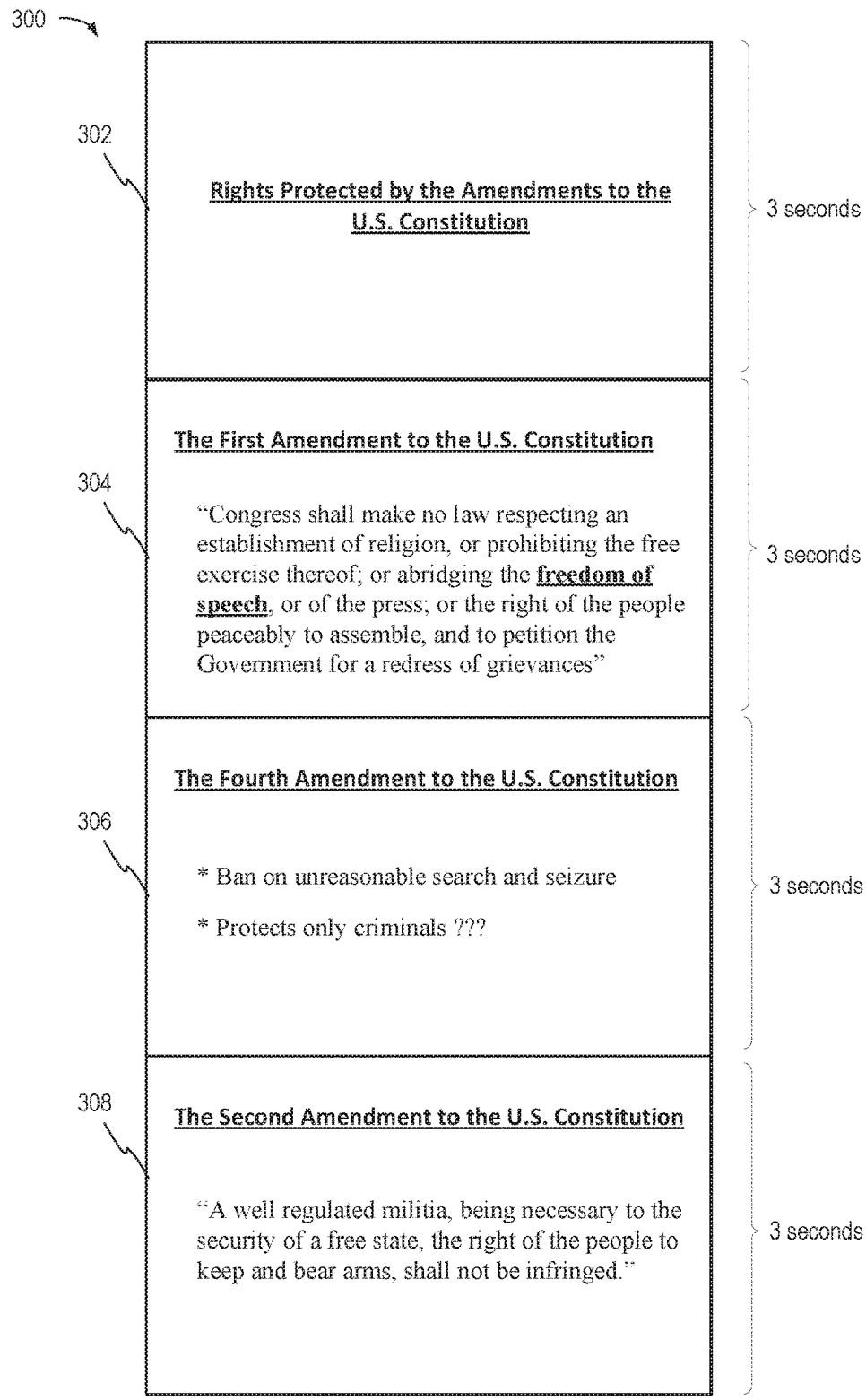
FIG. 3 is a block diagram illustrating an example preview including multiple key frames from a presentation, in accordance with embodiments.

FIG. 3 is a block diagram illustrating an example preview 300 including multiple key frames from a shared presentation. In this example, the preview 300 includes 4 key frames. Specifically, a first key frame 302 is the first key frame of a shared presentation during a web conference. This key frame 302 is automatically selected for inclusion in the preview based on it being the first key frame in the presentation and thus likely to include a general title descriptive of the general subject matter of the web conference. The second key frame 304 relates to "The First Amendment to the U.S. Constitution" and was selected for inclusion in the preview based on user interactions with the web conference while the key frame content was displayed during the web conference. In the example of FIG. 2, a preview generation module detects that 3 participant interactions occurred while the web conference displayed the content of key frame 304, e.g., while the slide relating to the First Amendment to the U.S. Constitution was displayed during the web conference. Similarly, key frames 306 and key frame 308 are each selected for inclusion in the preview 300 based on user interactions that occurred during display of content related to their respective key frames during the web conference.

Figure 4:
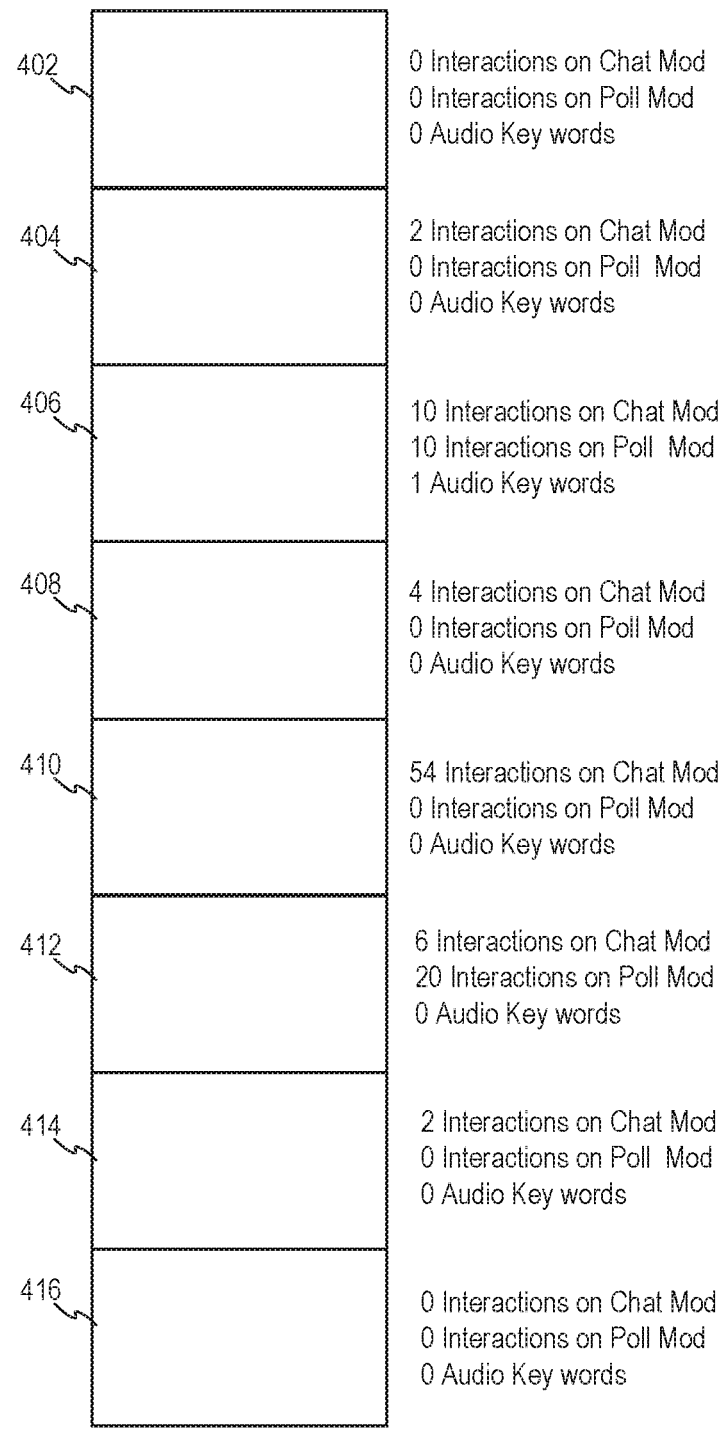
FIG. 4 is a block diagram illustrating an example of multiple key frames from a presentation, in accordance with embodiments.

FIG. 4 is a block diagram illustrating an example of multiple key frames 402, 404, 406, 408, 410, 412, 414, 416 from a presentation. A preview generation module identifies these key frames 402, 404, 406, 408, 410, 412, 414, 416 from a presentation. In one example in which the presentation is a slide presentation, the slides (full versions) are identified as the key frames. In another example, in which the presentation is a shared screen, images are compared with one another to identify key frames. In another example in which the presentation is shared screen with a slide presentation, key frames are identified by taking an image for a shared screen feed at periodic intervals (e.g., every 10 seconds) and removing duplicative (or near duplicative) images and uses the remaining images as key frames.

The preview generation module next analyzes information about the key frames to select a subset of key frames for a preview. For example, the preview generation module analyzes the number of interactions with a chat mod, the number of interactions with a poll mod, and the number of instances of one or more particular key words in audio during the respective key frames (i.e., within the time ranges that each of the key frames is presented). In this example, for a four key frame preview, the preview generation module selects the first key frame 402 because it is the first key frame, and key frames 406, 410, and 412 based on their greater number of user interactions and/or the presence of audio key words. In one example, key frames are selected by selecting a specified number of key frames having the most user interaction or other desirable characteristics. In another example, all key frames with characteristics that satisfy predetermined threshold criteria are selected for inclusion in the preview.

Figure 5:
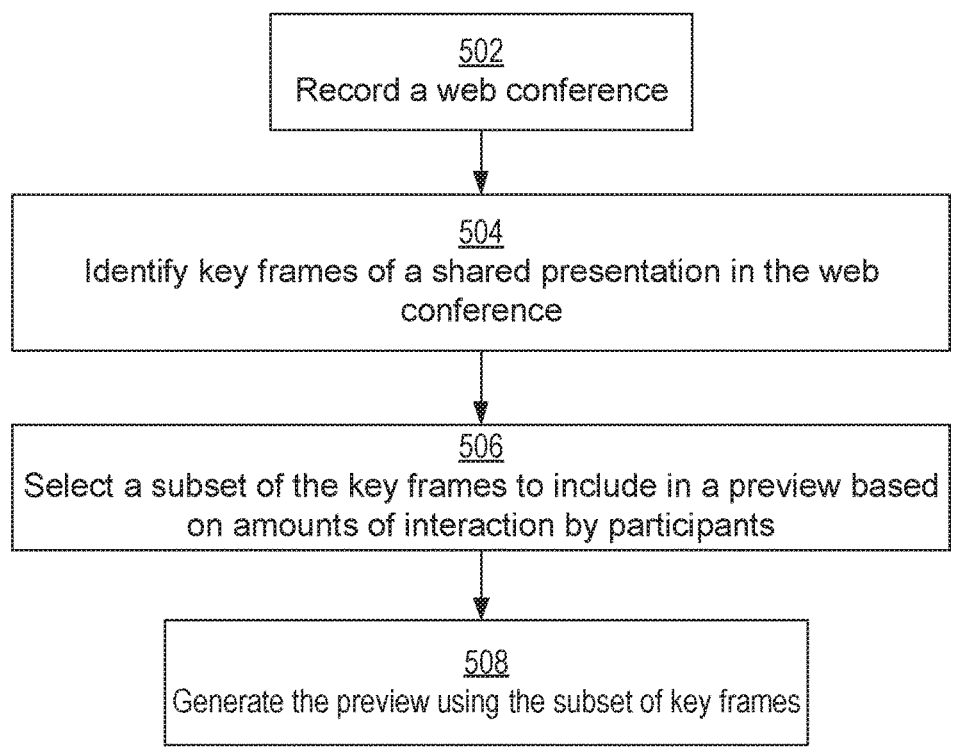
FIG. 5 is a flowchart illustrating an example method for auto-generating a preview of a web conference based on participant interactions during the web conference.

FIG. 5 is a flowchart illustrating an example method 500 for auto-generating a preview of a web conference based on participant interactions during the web conference. Such an example method may be performed on a variety of computer devices including, but not limited to, the computing devices 103a and 103b, and the host system 102 of FIG. 1, and the computing system 600 of FIG. 6.

The exemplary method 500 involves act 502 to record a web conference. In one embodiment this involves capturing and recording a streamed video image of images shared during the web conference. In another embodiment, this involves recording document content, such as pages from a word processing document or slides from a presentation.

In one example, a processor 106 of a host system 102 executes a recording module 115 to record the web conference. The recording module 115 configures the processor 106 to identify streamed video images, pages from a word processing document, slides from a presentation, or other portions of electronic content 117 that is provided to one or more of the client computing devices 103a, 103b during a web conference. The recording module 115 further configures the processor 106 to store copy copies of the identified portions of the electronic content 117 to a memory 108 as a recording 113 (or a part of a recording 113). For instance, the recording module 115 may generate data identifying a particular web conference and add or otherwise associate that data with copies of the identified portions of the electronic content 117 presented during the web conference. In additional or alternative embodiments, suitable program code may be executed at one or more of the computing devices 103a, 103b to perform these operations for recording a web conference.

The exemplary method 500 further involves act 504 to identify a key frame of a shared presentation in the web conference. The key frames are identified by taking images from different times during the presentation in one embodiment. In another embodiment, the key frames are identified by taking content from a document or slide presentation. In one example, key frames are identified by identifying similarities and differences between content of the shared presentation at different points in time during the web conference. For example, where a shared presentation is an uploaded file provided by a presenter with delimited slides, the slides are identified as the key frames. Slide transitions in the recorded video of a slide presentation are also automatically detected. In one embodiment, this involves doing an image diff between 2 frames. If the 2 frames are not different by a certain percentage (e.g. 15%) then the technique assumes the 2 frames are for the same slide. Similarly, small differences between frames that involve significant similarity is also used to identify that only one of the frames (e.g., the one with more content) should be identified as a key frame.

In some embodiments, the processor 106 of the host system 102 executes the preview generation module 116 to identify one or more key frames. For example, executing the preview generation module 116 may configure the processor 106 to analyze either a live web conference or a recording 113 of a web conference to generate an electronic copy of at least some content that is shared via the web conference (e.g., by creating a preview of the content). The preview generation module 116 references the stored copy of the web conference to obtain data identifying interactions with the content presented via the web conference. For example, a log or other data may identify mouse clicks, keyboard inputs, touch screen inputs, or other inputs that modified, selected, or otherwise interacted with electronic content presented via the web conference. This data may include time stamps, coordinate information, or other information associating a given input with a given electronic content item. The preview generation module 116 may identify which frames of content are associated with a certain amount of input (e.g., frames with a number of inputs above a threshold, frames with the largest relative number of inputs, etc.).

In additional or alternative embodiments, the processor 106 or another suitable processor (e.g., one or more of the processors 118a, 118b) performs one or more other operations for identifying key frames (e.g., by executing the preview generation module 116 or other suitable program code). These operations can involve a processor referencing any data associated with a web conference and determining from the data that certain frames are of interest to participants in the web conference. The processor can identify the key frames based on the data indicating that these frames are of interest to one or more participants.

For example, executing the preview generation module 116 or other suitable program code can configure a suitable processing device to identify amounts of communication that occur during certain frames. This communication can include, for example, audio content captured as participants speak to one another, interactions with a graphical interface in which content is presented via the web conference, etc. For recordings of web conferences, data representing these communications can be time-stamped, which allows a processing device to associate communications that occurred at certain times with the key frames of content that were presented at the same time (or nearly the same time). The preview generation module 116 or other suitable program code configures a suitable processing device to identify certain frames as key frames based on communications occurring at or near the time when those frames are presented.

The exemplary method 500 further involves act 506 to select a subset of the key frames to include in the preview based on amounts of interaction by participants that occurred during presentation of the key frames. In one embodiment, selecting the subset of key frames to include in the preview involves a processor 106 or other suitable processing device executing suitable program code for selecting key frames during which greater participant interactivity occurs. The processing device includes the selected key frames in the preview. In another embodiment, selecting the subset of key frames to include in the preview involves a processor 106 or other suitable processing device executing suitable program code for assessing participant interactivity occurring in different pods. The processing code weights the different pods differently from one another. For example, a chat pod is given more weight than a poll pod in one implementation. Selecting the subset of key frames to include in the preview additionally or alternatively involves a processor 106 or other suitable processing device executing identifying a start image or an end image of the shared presentation to use as a key frame.

In some embodiments, the processor 106 of the host system 102 executes the preview generation module 116 to select a subset of the key frames. In one example, the processor 106 may execute the preview generation module 116 to select a subset of the key frames to include in a preview based on amounts of inputs (i.e., interactions by participants that occurred during presentation of the key frames) that are identified in act 502. In another example, the processor 106 may execute the preview generation module 116 to select a subset of the key frames to include in a preview based on referencing other data associated with the frames that indicates one or more participants' interest in certain frames.

For example, executing the preview generation module 116 or other suitable program code can configure a suitable processing device to analyze amounts of communication that occur during certain frames. The preview generation module 116 or other suitable program code configures a suitable processing device to select certain key based on the amount of communications occurring at or near the time when those frames are presented. For example, the processing device may select key frames associated with a threshold amount of communication, key frames associated with larger amounts of communication than other key frames, etc.

Audio of the web presentation is additionally or alternatively used to select key frames in one implementation. In one example, this involves detecting a word or phrase occurring frequently in audio of the web conference and identifying key frames in which the word or phrase occurs. Similarly, in another embodiment, key frames are weighted differently (i.e., scored higher) based on the word or phrase occurring in the key frames.

In one embodiment, selecting the subset of key frames to include in the preview involves scoring key frames having fewer words or larger font size greater than key frames having more words or smaller font size. Similarly, in one embodiment, selecting the subset of key frames is additionally or alternatively based on relative amounts of time key frames are presented during the shared presentation.

In selecting the subset of key frames based on user interactions, one embodiment weights user interactions with different pods of the web conference differently. Based on this weight, the amount of interaction associated with a pod will be considered as more or less important.

The preview generation module 116 (or other suitable algorithm executed by a processing device) can use any suitable criteria for determining which key frames are to be selected. In one example, start frames and end frames may always be selected. In another example involving web conferences with slide presentations, the preview generation module 116 may detect slide transitions (e.g., changes in image content being presented) and use frames before or after the transition as selected key frames for a preview.

The exemplary method 500 further involves act 508 to generate the preview using the subset of key frames. For example, the processor 106 of the host system 102 executes the preview generation module 116 to generate a preview that includes a sequence of the subset of key frames presented one after another. In one embodiment, the processor 106 or another suitable device detects a word or phrase occurring frequently in audio of the web conference. The processor 106 or another suitable device adds a soundtrack to the preview based on the word or phrase.

For example, the processor 106 or another suitable device may execute a preview generation module 116 or other suitable program code that includes voice-to-text translation functionality and optical character recognition functionality. The preview generation module 116 or other suitable program code configures a suitable processing device (e.g., the processor 106) to identify text from audio content (e.g., audio received during the web conference) exchanged or presented during the web conference. The preview generation module 116 or other suitable program code then configures a suitable processing device (e.g., the processor 106) to identify non-common words in the text that appear frequently. For example, this technique can be used to identify that much of the verbal discussion between participants related to "stylus" and "pen input" devices in a particular web conference.

In some embodiments, the preview generation module 116 or other suitable program code may configure a suitable processing device to determine that certain words on a blacklist or other exclusion list should be identified as less meaningful. For example, a blacklist or other exclusion list may include word such as "like," "or," or other commonly used words. The preview generation module 116 identifies these words in a transcript of the audio, matches the words in the transcript to the blacklist or other exclusion list, and excludes these words (or otherwise assigns a lower significance to them) based on matching these words to the blacklist or exclusion list.

In one embodiment, the preview includes selection options for navigating directly to portions of a recording of the web conference during which the respective key frames of the subset of key frames are presented. For example, the preview generation module 116 or other suitable program code can configure a suitable processing device (e.g., the processor 106) to add bookmarks or other suitable navigational data to a recording 113 of the web conference. The bookmarks or other suitable navigational data allow a user to navigate directly to portions of a recording of the web conference during which the respective key frames of the subset of key frames are presented.

Multiple key frames can be created from a single presentation. In one embodiment, different previews of the web conference are created for different recipients based on different weights of pods used in assessing interactivity during the web conference to select subsets of key frames to include in the different previews.

The generated preview or previews are provided to an audience. In one example, the previews are automatically published following a web conference conclusion. In another example, generated previews are distributed to users via electronic advertisements. In another example, the previews are published on a web page.

Figure 6:
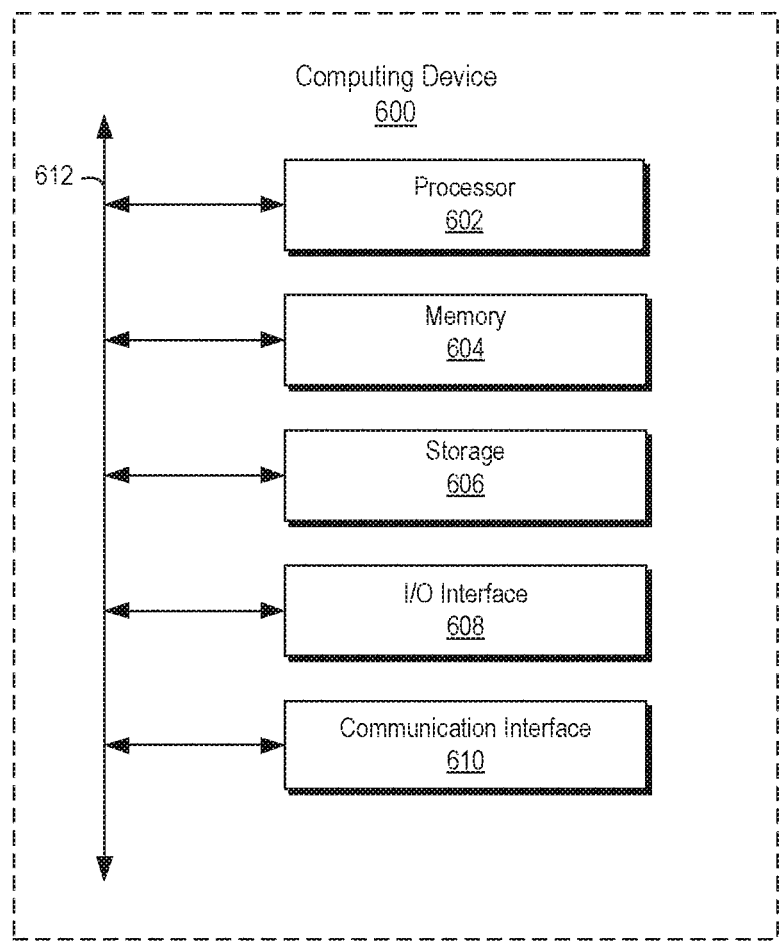
FIG. 6 is a diagram of an exemplary computer system in which embodiments of the present disclosure can be implemented.

Any suitable computing system or group of computing systems can be used to implement the techniques and methods disclosed herein. For example, FIG. 6 is a block diagram depicting examples of implementations of such components. The computing device 600 can include a processor 602 that is communicatively coupled to a memory 604 and that executes computer-executable program code and/or accesses information stored in memory 604 or storage 606. The processor 602 may comprise a microprocessor, an application-specific integrated circuit ("ASIC"), a state machine, or other processing device. The processor 602 can include one processing device or more than one processing device. Such a processor can include or may be in communication with a computer-readable medium storing instructions that, when executed by the processor 602, cause the processor to perform the operations described herein.

The memory 604 and storage 606 can include any suitable non-transitory computer-readable medium. The computer-readable medium can include any electronic, optical, magnetic, or other storage device capable of providing a processor with computer-readable instructions or other program code. Non-limiting examples of a computer-readable medium include a magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C#, Visual Basic, Java, Python, Perl, JavaScript, and ActionScript.

The computing device 600 may also comprise a number of external or internal devices such as input or output devices. For example, the computing device is shown with an input/output ("I/O") interface 808 that can receive input from input devices or provide output to output devices. A communication interface 610 may also be included in the computing device 600 and can include any device or group of devices suitable for establishing a wired or wireless data connection to one or more data networks. Non-limiting examples of the communication interface 610 include an Ethernet network adapter, a modem, and/or the like. The computing device 600 can transmit messages as electronic or optical signals via the communication interface 610. A bus 612 can also be included to communicatively couple one or more components of the computing device 600.

The computing device 600 can execute program code that configures the processor 602 to perform one or more of the operations described above. The program code can include one or more modules. The program code may be resident in the memory 804, storage 606, or any suitable computer-readable medium and may be executed by the processor 602 or any other suitable processor. In some embodiments, modules can be resident in the memory 604. In additional or alternative embodiments, one or more modules can be resident in a memory that is accessible via a data network, such as a memory accessible to a cloud service.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure the claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A computer-implemented method for auto-generating a preview of a web conference based on participant interactions during the web conference, the method comprising:
   recording the web conference, the web conference comprising a shared presentation and participant interactions;
   identifying key frames of the shared presentation;
   selecting, by a processor, a subset of the key frames to include in the preview based on amounts of interaction by participants that occurred during presentation of the key frames; and
   generating the preview using the subset of key frames.

2. The computer-implemented method of claim 1, wherein selecting the subset of key frames to include in the preview further comprises selecting key frames during which greater participant interactivity occurs to include in the preview.

3. The computer-implemented method of claim 1, wherein selecting the subset of key frames to include in the preview further comprises assessing participant interactivity occurring in different pods, wherein the different pods are weighted differently from one another.

4. The computer-implemented method of claim 1, wherein selecting the subset of key frames to include in the preview further comprises identifying a start image or an end image of the shared presentation to use as a key frame.

5. The computer-implemented method of claim 1, wherein selecting the subset of key frames to include in the preview further comprises detecting a word or phrase occurring frequently in audio of the web conference and identifying key frames in which the word or phrase occurs.

6. The computer-implemented method of claim 1, wherein selecting the subset of key frames to include in the preview further comprises detecting a word or phrase occurring frequently in audio of the web conference and weighting key frames in which the word or phrase occurs higher than key frames in which the word or phrase does not occur.

7. The computer-implemented method of claim 1, wherein selecting the subset of key frames to include in the preview further comprises weighting key frames with fewer words or larger font size higher than key frames with more words or smaller font size.

8. The computer-implemented method of claim 1, wherein selecting the subset of key frames to include in the preview is further based on relative amounts of time key frames are presented during the shared presentation.

9. The computer-implemented method of claim 1, wherein the shared presentation is presented in a presentation pod shared by a presenter, wherein the interactions occur in a chat pod in which participants type messages that are shared with other participants.

10. The computer-implemented method of claim 1, wherein identifying the key frames comprises identifying similarities and differences between content of the shared presentation at different points in time during the web conference.

11. The computer-implemented method of claim 1, wherein the preview comprises a sequence of the subset of key frames presented one after another.

12. The computer-implemented method of claim 1 further comprising creating different previews of the web conference for different recipients based on different weights of pods used in assessing interactivity during the web conference to select subsets of key frames to include in the different previews.

13. The computer-implemented method of claim 1 further comprising detecting a word or phrase occurring frequently in audio of the web conference and including a soundtrack in the preview based on the word or phrase.

14. The computer-implemented method of claim 1, wherein the shared presentation is an uploaded file provided by the presenter with delimited slides, wherein the slides are identified as the key frames.

15. The computer-implemented method of claim 1, wherein the preview comprises selection options for navigating directly to portions of a recording of the web conference during which the respective key frames of the subset of key frames are presented.

16. A system for hosting a web conference, the system comprising:
   a processor; and
   a memory having executable instructions stored thereon, that, if executed by the processor, cause the system to perform operations comprising:
      recording the web conference, the web conference comprising a shared presentation and participant interactions;
      identifying key frames of the shared presentation;
      selecting, by a processor, a subset of the key frames to include in the preview based on amounts of interaction by participants that occurred during presentation of the key frames; and
      generating the preview using the subset of key frames.

17. The computer-implemented method of claim 1, wherein selecting the subset of key frames to include in the preview further comprises selecting key frames during which greater participant interactivity occurs to include in the preview.

18. The computer-implemented method of claim 1, wherein selecting the subset of key frames to include in the preview further comprises assessing participant interactivity occurring in different pods, wherein the different pods are weighted differently from one another.

19. A non-transitory computer readable storage medium having executable instructions stored thereon, that, if executed by a computing device, cause the computing device to perform operations for hosting a web conference and facilitating generation of a preview, the instructions comprising instructions for:
   recording the web conference, the web conference comprising a shared presentation and participant interactions;
   identifying key frames of the shared presentation;
   selecting, by a processor, a subset of the key frames to include in the preview based on amounts of interaction by participants that occurred during presentation of the key frames; and
   generating the preview using the subset of key frames.

20. The computer readable storage medium of claim 19, wherein selecting the subset of key frames to include in the preview further comprises selecting key frames during which greater participant interactivity occurs to include in the preview.

* * * * *